(12) United States Patent
Mentzer (10) Patent No.: US 7,492,394 B2
(45) Date of Patent: Feb. 17, 2009

(54) SYSTEM AND METHOD FOR CORRECTING ERRONEOUS IMAGE SIGNALS FROM DEFECTIVE PHOTOSENSITIVE PIXELS DURING ANALOG-TO-DIGITAL CONVERSION

(75) Inventor: Ray Alan Mentzer, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 682 days.

(21) Appl. No.: 09/827,942

(22) Filed: Apr. 6, 2001

(65) Prior Publication Data

US 2002/0145672 A1    Oct. 10, 2002

(51) Int. Cl.
*H04N 5/235* (2006.01)
*H03M 1/12* (2006.01)

(52) U.S. Cl. .................... 348/229.1; 341/155
(58) Field of Classification Search ................. 348/241, 348/246, 247, 229.1, 230, 362, 272; 341/155, 341/172; 358/505, 515
See application file for complete search history.

(56) References Cited

U.S. PATENT DOCUMENTS

| | | | | |
|---|---|---|---|---|
| 4,278,995 A * | 7/1981 | Fearnside et al. | ........... | 348/104 |
| 4,535,359 A | 8/1985 | Fearnside | .................... | 358/163 |
| 4,573,035 A * | 2/1986 | Dolazza | ...................... | 341/138 |
| 5,982,318 A * | 11/1999 | Yiannoulos | ................. | 341/155 |
| 6,181,830 B1 | 1/2001 | Sato | .......................... | 382/274 |
| 6,275,259 B1 * | 8/2001 | Gowda et al. | ............ | 348/229.1 |
| 6,587,144 B1 * | 7/2003 | Kim | .......................... | 348/241 |
| 6,654,054 B1 * | 11/2003 | Embler | ....................... | 348/241 |
| 6,850,276 B1 * | 2/2005 | Dobusch et al. | ............. | 348/255 |

* cited by examiner

*Primary Examiner*—Yogesh Aggarwal
(74) *Attorney, Agent, or Firm*—Ratner Prestia (57) ABSTRACT

A system and a method for correcting erroneous image signals from defective photosensitive pixels utilizes an analog-to-digital converter (ADC) architecture that corrects the erroneous image signals as image signals are being converted from analog signals to digital signals. The erroneous image signals are corrected by limiting the deviation of a given analog image signal from a previously processed image signal.

21 Claims, 5 Drawing Sheets

SYSTEM AND METHOD FOR CORRECTING ERRONEOUS IMAGE SIGNALS FROM DEFECTIVE PHOTOSENSITIVE PIXELS DURING ANALOG-TO-DIGITAL CONVERSION

FIELD OF THE INVENTION

The invention relates generally to the field of digital imaging, and more particularly to a system and method for correcting erroneous image signals from defective photosensitive pixels.

BACKGROUND OF THE INVENTION

Demand for digital cameras has dramatically increased in the consumer market place for various reasons. One reason for this demand is the fact that digital camera produce digital photos, which are readily distributable through an electronic medium, such as the Internet. Thus, friends and families can exchange digital photos as easily as sending and receiving emails. Another reason for the increased demand is that digital photos produced by the digital cameras can be enhanced and manipulated using an image processing software. Still another reason for the demand is that digital cameras include features that make the digital cameras more attractive than conventional cameras, such as a preview of captured images and an option to delete unwanted images.

A digital camera typically employs a solid-state image sensor, either a Charge Coupled Device (CCD) sensor or a Complementary Metal Oxide Semiconductor (CMOS) sensor, to digitally capture a scene of interest. A solid-state image sensor includes an array of photosensitive pixels. Each photosensitive pixel corresponds to an image pixel of a digitally captured image. Thus, the resolution of digitally captured image is dependent on the number of photosensitive pixels included in the image sensor. Consequently, there is a growing interest to develop image sensors with increased number of photosensitive pixels.

A problem with solid-state image sensors is that the sensors may include a significant number of defective photosensitive pixels. Defective photosensitive pixels may be classified as "hot pixels" or "cold pixels". Hot pixels produce unnaturally bright image pixels in digitally captured images, which are caused by leakage current in the photosensitive pixels during an integration period, i.e., the exposure period to capture a scene of interest. Thus, hot pixels may result in a digital image with bright artifacts due to isolated bright image pixels on a dark background. In contrast to the hot pixels, cold pixels produce unnaturally dark image pixels in digitally captured images. Cold pixels are non-responsive photosensitive pixels that fail to accumulate sufficient charge during an integration period. Thus, cold pixels may result in a digital image with dark artifacts due to isolated dark image pixels on a bright background. The number of these artifacts is likely to increase as the density of photosensitive pixels is increased in solid-state image sensors, since more defective photosensitive pixels are expected to be found in image sensors with higher density of photosensitive pixels. Thus, the bright and dark artifacts caused by the hot and cold pixels pose a greater problem of image degradation for mega-pixel sensors.

One conventional approach to alleviate the problem of hot and cold pixels is to map the defective photosensitive pixels in each image sensor by testing all the photosensitive pixels after manufacturing the image sensor. The map of the defective photosensitive pixels can then be used to correct the erroneous image signals produced by the defective photosensitive pixels. Thus, each digital camera is customized to correct the image signals from the mapped defective photosensitive pixels of a specific image sensor. However, this approach introduces complex testing and customization processes, which increase the overall manufacturing cost of the digital cameras.

Another conventional approach to alleviate the problem of hot and cold pixels is to detect and correct the erroneous image signals from defective photosensitive pixels using an algorithm after the analog image signals have been converted to digital image signals. An advantage of this approach is that the same algorithm can be used in all the digital cameras. Thus, customization of the digital cameras in accordance with each image sensor is not required. However, this approach does require a significant amount of processing resources for the algorithm, which tends to increase the power usage of the digital cameras and tends to slow down the operation of the digital cameras to process digitally captured images.

In view of the disadvantages of the conventional approaches to alleviate the problem of hot and cold pixels, there is a need for a system and method for efficiently correcting image signals from defective photosensitive pixels.

SUMMARY OF THE INVENTION

A system and method for correcting erroneous image signals from defective photosensitive pixels utilizes an analog-to-digital converter (ADC) architecture that corrects the erroneous image signals as image signals are being converted from analog signals to digital signals. The erroneous image signals are corrected by limiting the deviation of a given analog image signal from a previously processed image signal. The ADC architecture eliminates the need for post-analog-to-digital conversion processing to correct the erroneous image signals from the defective pixels. In addition, the ADC architecture requires only 3 clock cycles for 10 bit conversion, which is faster by 8 clock cycles than a conventional ADC architecture.

A system for correcting erroneous image signals in accordance with the present invention includes circuitry for outputting a high signal and a low signal based on a signal of a previously processed pixel, and an analog-to-digital converter having a high reference input and a low reference input to receive the high and low signals. The high and low signals define a signal range about the image signal of the previously processed pixel. The analog-to-digital converter is configured to digitize an analog signal of a current pixel using the high and low signals as references to derive a digitized signal of the current pixel within the signal range such that the analog signal of the current pixel is limited when a signal difference between the previously processed pixel and the current pixel is greater than a predefined threshold. Although the analog-to-digital converter may be any known type of analog-to-digital converter, the analog-to-digital converter is preferably a flash analog-to-digital converter to achieve a fast frame rate.

The circuitry of the system may include a digital-to-analog converter to generate the high and low signals from the image signal of the previously processed pixel. The digital-to-analog converter may be configured to convert an input digital signal having more bits than the digitized signal of the current pixel. In one embodiment, the digital-to-analog converter is a ten bit analog-to-digital converter, and the analog-to-digital converter is a seven bit analog-to-digital converter.

In an embodiment, the circuitry includes a comparator that outputs a comparison signal to the digital-to-analog converter. The comparison signal is based on a comparison of the analog signal of the current pixel with an analog signal of a previously processed pixel. In this embodiment, the digital-to-analog converter may be a ten bit analog-to-digital converter, and the analog-to-digital converter may be a six bit analog-to-digital converter.

A method of correcting erroneous image signals in accordance with the present invention includes the steps of providing a high signal and a low signal based on an image signal of a previously processed pixel, and digitizing an analog signal of a current pixel within a signal range defined by the high and low signals using the high and low signals as references to derive a digitized signal of the current pixel. The step of digitizing the analog signal of the current pixel includes limiting the analog signal of the current pixel by the high and low signals when a signal difference between the previously processed pixel and the current pixel is greater than a predefined threshold.

The method may further include the step of converting the image signal of the previously processed pixel to the high signal and the low signal. In particular, the step of converting the image signal of the previously processed pixel may involve digital-to-analog conversion.

In an embodiment, the method further includes the step of comparing the analog signal of the current pixel with an analog signal of a previously processed pixel. In this embodiment, the high and low signals are dependent on the comparison of the analog signal of the current pixel with the analog signal of the subsequent pixel.

Other aspects and advantages of the present invention will become apparent from the following detailed description, taken in conjunction with the accompanying drawings, illustrated by way of example of the principles of the invention.

DETAILED DESCRIPTION

A digital imaging system and method for correcting erroneous image signals from defective photosensitive pixels utilizes an analog-to-digital converter (ADC) architecture that corrects the erroneous image signals as image signals are being converted from analog signals to digital signals. The ADC architecture eliminates the need for post-analog-to-digital conversion processing to correct the erroneous image signals from the defective pixels. In addition, the ADC architecture requires only 3 clock cycles for 10 bit conversion, which is faster by 8 clock cycles than a conventional ADC architecture.

Figure 1:
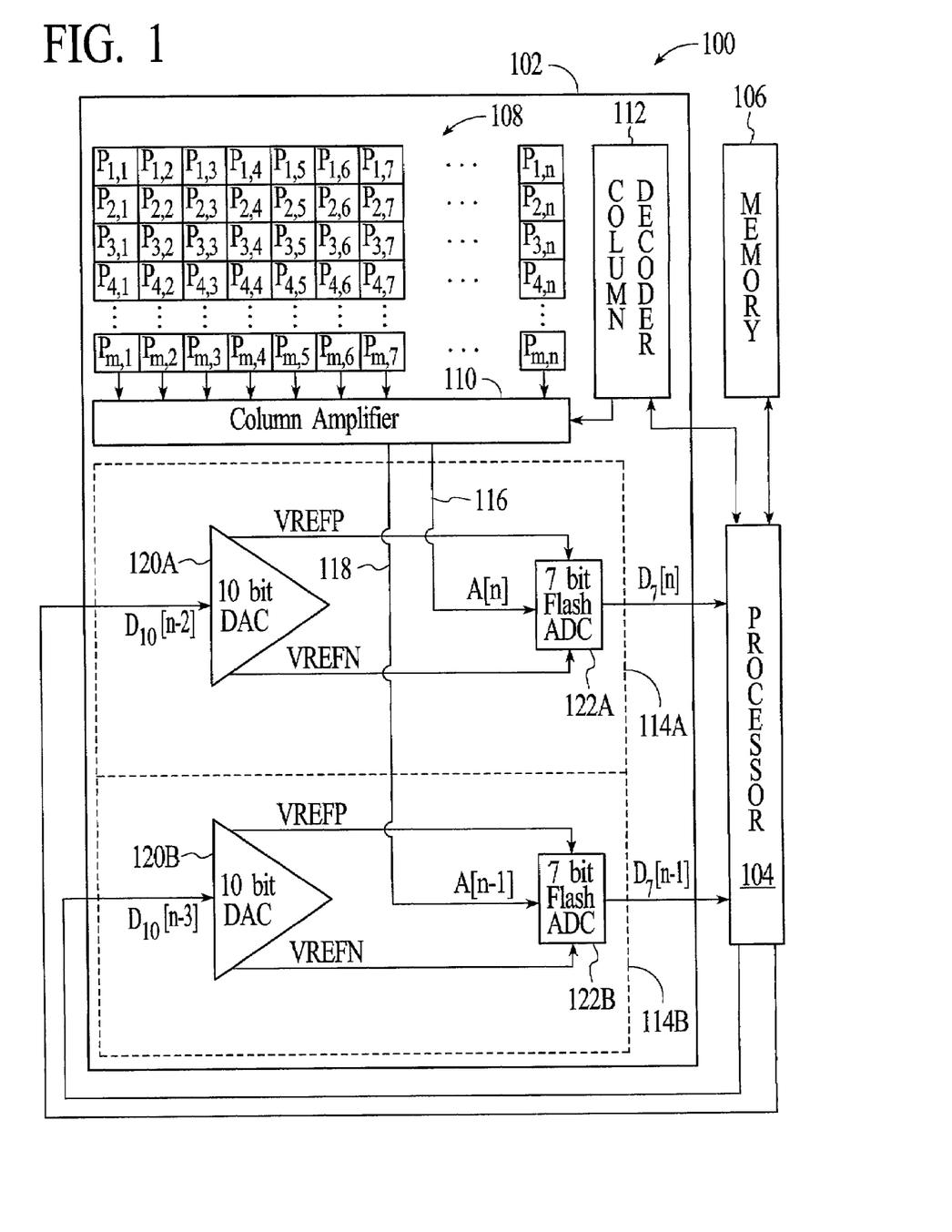
FIG. 1 is a block diagram of a digital imaging system in accordance with a first embodiment of the present invention.

With reference to FIG. 1, a digital imaging system 100 in accordance with a first embodiment of the present invention is shown. The digital imaging system includes an image sensor module 102, a processor 104 and memory 106. The image sensor module includes a sensor array 108, a column amplifier 110, a column decoder 112, and analog-to-digital converter (ADC) units 114A and 114B. The image sensor module also includes other conventional components commonly found in an image sensor. However, these conventional components are not described herein to simplify the description of the invention.

The sensor array 108 of the image sensor module 102 includes m×n photosensitive pixels. The number of photosensitive pixels included in the sensor array depends on the type of the image sensor module. As an example, if the image sensor module is a VGA sensor, the sensor array would include 640×480 photosensitive pixels. In an exemplary embodiment, the photosensitive pixels are Complementary Metal Oxide Semiconductor (CMOS) pixels. The photosensitive pixels of the sensor array 108 are sensitive to any light having a wavelength between approximately 300 nm to 1100 nm, and thus, cannot discriminate between different color lights. Consequently, when capturing a scene of interest, each of the photosensitive pixels in the sensor array is only exposed to light of a particular primary color, e.g. red, green or blue, to accumulate charge to capture the scene as a mosaiced image. The accumulated charges in the photosensitive pixels are analog image signals that represent the captured scene.

Figure 2:
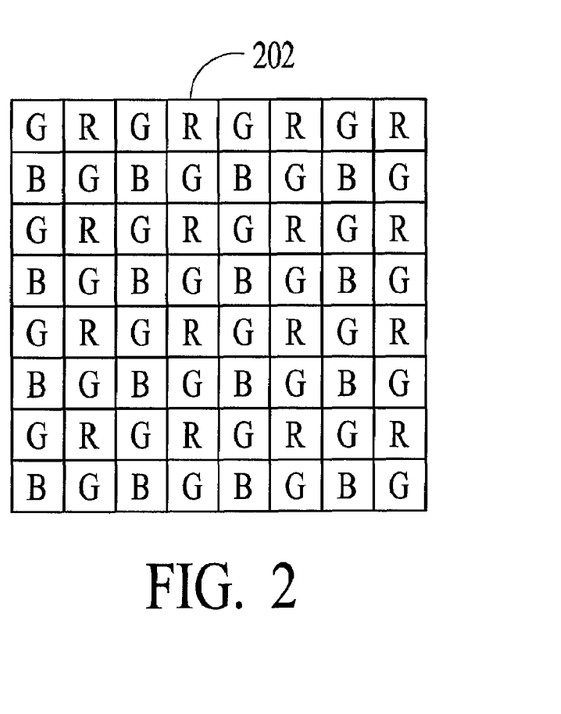
FIG. 2 illustrates a mosaiced image in a Bayer pattern.

In the exemplary embodiment, the sensor array 108 is designed to capture a scene of interest as a mosaiced image in a Bayer pattern 202, as illustrated in FIG. 2. As shown in FIG. 2, a row of the Bayer pattern includes alternating red ("R") and green ("G") pixels, or alternating blue ("B") and green ("G") pixels. Accordingly, during exposure to incident light, the photosensitive pixels of the sensor array accumulate charges for R, G and B in the same pattern. Thus, the Bayer pattern of FIG. 2 also represents the colors of the analog image signals that are generated in the sensor array to digitally capture a scene of interest.

The column amplifier 110 of the image sensor module 102 is electrically coupled to the sensor array 108 to receive analog image signals from a row of photosensitive pixels. The column amplifier includes n amplifying circuits (not shown) to sample and store analog signals from a row of photosensitive pixels during readout. The column decoder 112 of the image sensor module is coupled to the column amplifier. The column decoder operates to serially address each of the amplifying circuits of the column amplifier to serially extract the stored analog image signals in the column amplifier. In this first embodiment, the column amplifier has two output lines 116 and 118. The output line 116 is for the analog image signals in the column amplifier that are from the even numbered photosensitive pixels, which include only the signals for one of the primary colors. The output line 118 is for the analog image signals in the column amplifier that are from the odd numbered pixels, which include only the signals for one of the other two primary colors. Depending on the current row of photosensitive pixels being readout, only the analog image signals for R and G, or only the analog images signals for B and G will be extracted from the column amplifier.

The ADC units 114A and 114B of the image sensor module 102 are coupled to the column amplifier 110 to sequentially receive stored analog image signals from the column amplifier for a row of the photosensitive pixels being readout. The ADC units are essentially identical to each other. However, each of the ADC units operates only on image signals for one of two primary colors, which depend on the row of photosensitive pixels being readout. Since the analog signals in the sensor array 108 are in a Bayer pattern, as illustrated in FIG. 2, the ADC units operate on analog image signals for R and G, or analog image signals for B and G. Thus, the ADC unit 114A can be seen as operating only on the analog image signals from the even numbered pixels for a selected row of photosensitive pixels, while the ADC unit 114B can be seen as operating only on the analog image signals from the odd numbered pixels for that row of photosensitive pixels. Therefore, the ADC units operate in an alternating fashion to serially process the analog image signals in the column amplifier. Since the ADC units are essentially identical, only the ADC unit 114A is described in detail.

As shown in FIG. 1, the ADC unit 114A includes a 10 bit digital-to-analog converter (DAC) 120A and a 7 bit flash ADC 122A. These components of the ADC unit are described with reference to FIG. 3, which illustrates the current row of photosensitive pixels being readout through the column amplifier 110. The [n] pixel represents the current pixel that is being readout for analog-to-digital conversion. The 10 bit DAC is configured to receive the 10 bit digital signal $D_{10}[n-2]$ for the [n-2] pixel. Since every other pixel includes a signal for the same color, the $D_{10}[n-2]$ signal is the last converted image signal for the same color as the signal from the [n] pixel. With respect to pixel numbers, the $D_{10}[n-2]$ signal is the last converted digital image signal for an even numbered photosensitive pixel. Using the $D_{10}[n-2]$ signal, the 10 bit DAC outputs a high voltage ("VREFP") and a low voltage ("VREFN"), which are set such that:

$VREFP=D_{10}[n-2]+64$, and $VREFN=D_{10}[n-2]-64$.

The 7 bit flash ADC 122A of the ADC unit 114A is connected to the column amplifier 110 by the output line 116 to sequentially receive analog image signals. The 7 bit flash ADC operates to convert the analog image signal A[n] from the [n] pixel to a 7 bit digital signal $D_7[n]$ using the VREFP and VREFN voltages as references, which are dependent on the $D_{10}[n-2]$ signal. Thus, the range for analog-to-digital conversion of the 7 bit flash ADC is from $D_{10}[n-2]-64$ to $D_{10}[n-2]+64$, which limits the $D_7[n]$ signal. The limits posed by the VREFP and VREFN voltages correct analog image signals from defective photosensitive pixels, i.e., hot pixels and cold pixels. The output $D_7[n]$ signal of the flash ADC is transmitted to the processor 104 of the digital imaging system 100, where the 7 bit $D_7[n]$ signal is converted to a 10 bit digital image signal $D_{10}[n]$.

In the exemplary embodiment, the ADC unit 114A performs each analog-to-conversion in 3 clock cycles. During the first clock cycle, the digital $D_{10}[n-2]$ signal is used to generate the VREFP and VREFN voltages. During the second clock cycle, the analog A[n] signal is sampled. During the third clock cycle, the analog A[n] signal is digitized to the 7 bit digital $D_7[n]$ signal.

The other ADC unit 114B of the image sensor module 102 also includes a 10 bit DAC 120B and a 7 bit flash ADC 122B. However, the ADC unit 114B operates on the analog signals from the odd numbered photosensitive pixels of the current row of pixels being readout, i.e., the analog image signals for the other primary color for the current row of pixels. Thus, the input to the 7 bit flash ADC 122B is an analog image signal A[n-1] from the [n-1] pixel, which represents the current analog signal from an odd numbered pixel being extracted from the column amplifier 110 to the ADC unit 114B. The input to the 10 bit DAC 120B is the last converted 10 bit digital image signal $D_{10}[n-3]$ for the [n-3] pixel. The output of the ADC unit 114B is a 7 bit digital signal $D_7[n-1]$ for the [n-1] pixel, which is converted to a 10 bit digital image signal $D_{10}[n-1]$ by the processor 104.

Although the ADC units 114A and 114B are described herein as being configured to convert analog image signals to 10 bit digital image signals, the ADC units may be configured to convert analog image signals to higher or lower bit digital image signals. In alternative embodiments, the ADC units may utilize higher or lower bit DACs to generate the VREFP and VREFN voltages. In addition, higher or lower bit flash ADCs may be utilized instead of the 7 bit flash ADCs 122A and 122B to adjust the sensitivity of the ADC units for correction of erroneous signals from defective photosensitive pixels.

The processor 104 of the digital imaging system 100 can be any type of digital signal processor. The processor operates to convert the 7 bit $D_7[n]$ and $D_7[n-1]$ signals from the ADC units 114A and 114B to the 10 bit $D_{10}[n]$ and $D_{10}[n-1]$ signals using the $D_{10}[n-2]$ signal or the $D_{10}[n-3]$ signal as references. The memory 106 of the system is thus used to temporary store the $D_{10}[n-2]$ and $D_{10}[n-3]$ signals. For the [n] pixel, if the most significant bit (MSB) of the 7 bit $D_7[n]$ signal from the 7 bit flash ADC is "1", then the $D_7[n]$ signal is added to the 10 bit $D_{10}[n-2]$ signal to derive the 10 bit $D_{10}[n]$ signal. However, if the MSB of the 7 bit $D_7[n]$ signal from the 7 bit flash ADC is "0", then the $D_7[n]$ signal is subtracted from the 10 bit $D_{10}[n-2]$ signal to derive the 10 bit $D_{10}[n]$ signal. Similarly, for the [n-1] pixel, the 7 bit $D_7[n-1]$ signal is added to or subtracted from 10 bit $D_{10}[n-3]$ signal, depending on the MSB of the 7 bit $D_7[n-1]$ signal, to derive the 10 bit $D_{10}[n]$ signal.

Figure 3:
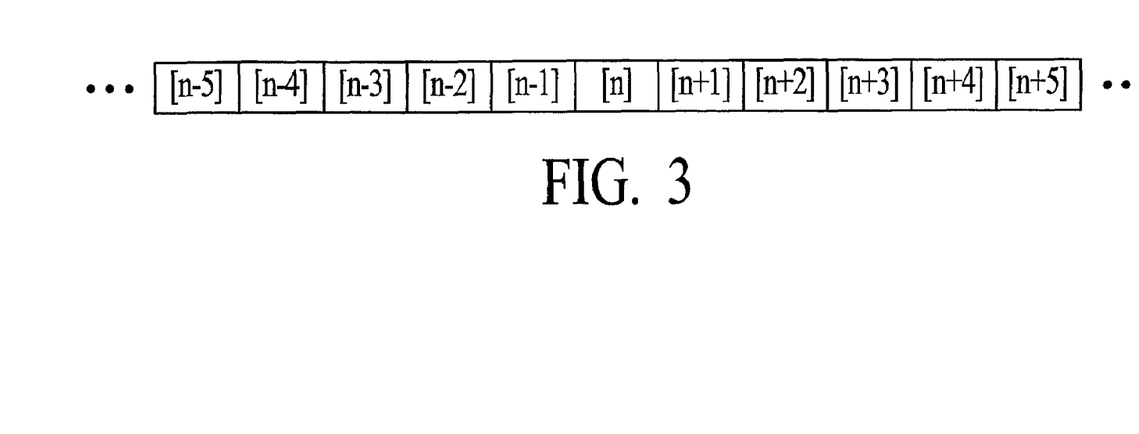
FIG. 3 illustrates a row of photosensitive pixels in a sensor array of the digital imaging system of FIG. 1 that is selected for readout of analog image signals.
Figure 4:
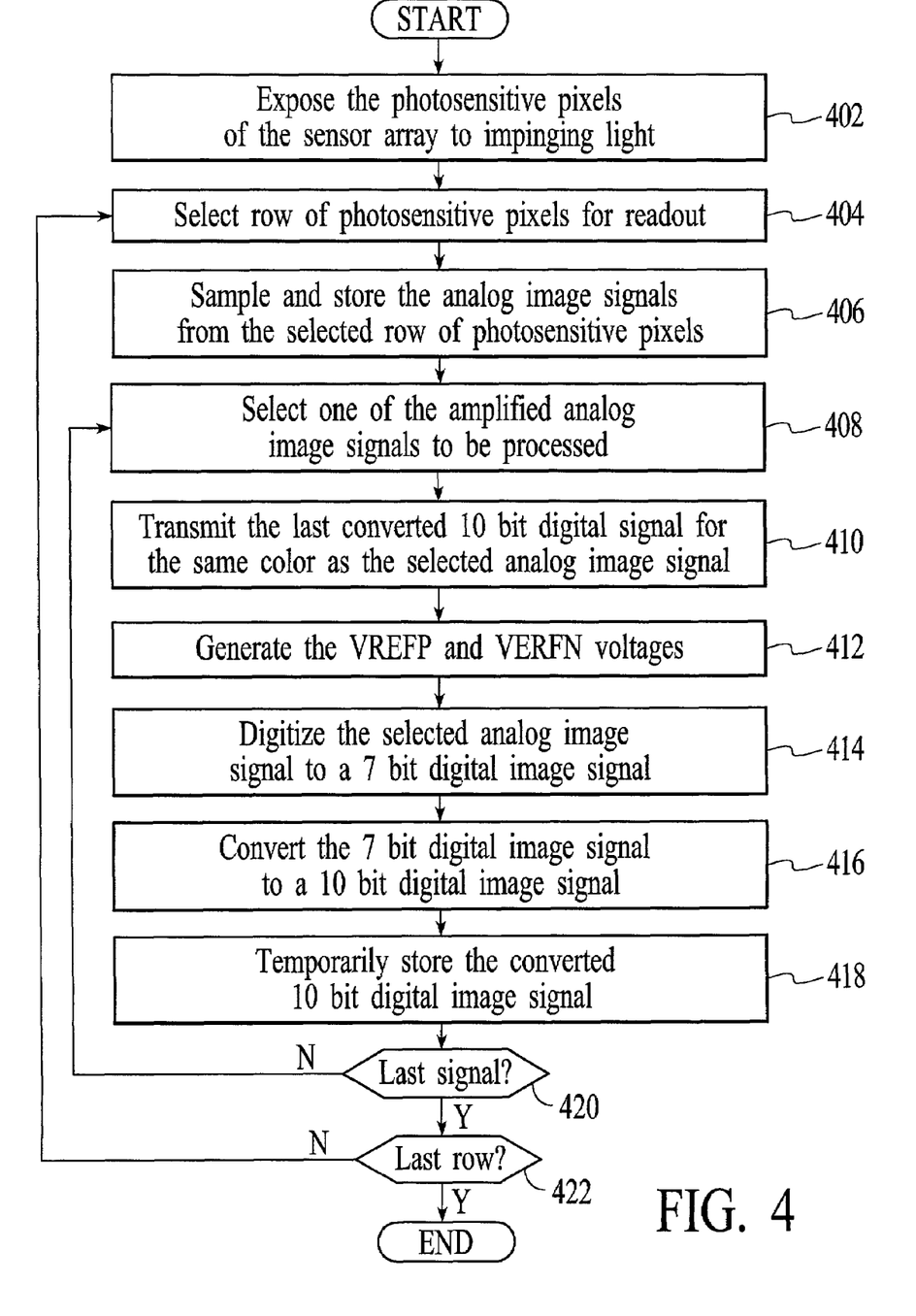
FIG. 4 is a process flow diagram illustrating the operation of the digital imaging system of FIG. 1.

The operation of the digital imaging system 100 is described with reference to the process flow diagram of FIG. 4 and the illustrated row of photosensitive pixels of FIG. 3. At step 402, the photosensitive pixels of the sensor array 108 are exposed to impinging light to capture a scene of interest in the form of analog electrical signals. As stated above, each photosensitive pixel is exposed to light of a particular primary color, e.g., R, G or B. After a predefined exposure period, a row of photosensitive pixels is selected for readout, at step 404. The analog image signals from the selected row of photosensitive pixels are then sampled and stored by the column amplifier 110, at step 406. The stored analog image signals are then serially extracted for analog-to-digital conversion.

Next, at step 408, one of the stored analog image signals is selected to be processed by the column decoder 112. If the selected analog image signal is from an even numbered photosensitive pixel, the selected analog image signal is processed by the ADC unit 114A. Otherwise, the selected analog image signal is processed by the ADC unit 114B. At step 410, the last converted 10 bit digital image signal for the same color as the selected analog image signal is transmitted to the 10 bit DAC 120. That is, if the selected analog image signal is from an even numbered photosensitive pixel, the last converted signal is the last signal from an even numbered pixel to be processed. The 10 bit digital image signal may be from the previously selected row of photosensitive pixels. If the selected analog image signal is the very first signal to be processed for a captured image, then the 10 bit digital image signal may be a default signal generated by the processor 104. Next, at step 412, the VREFP and VREFN voltages are generated by the 10 bit DAC using the last converted 10 bit digital image signal. At step 414, the selected analog image signal is then digitized to a 7 bit digital image signal by the 7 bit flash ADC 122 using the VREFP and VREFN voltages as references. The 7 bit digital image signal is then converted to a 10 bit digital signal by either adding the 7 bit digital image signal to the last converted 10 bit digital image signal or subtracting the 7 bit digital image signal from the last converted 10 bit digital image signal, depending on the MSB of the 7 bit digital image signal, at step 416. Next, at step 418, the converted 10 bit digital signal is temporarily stored in the memory to be used for the next analog signal from an even or odd numbered photosensitive pixel, depending on the current selected signal.

At step 420, a determination is made whether the selected analog image signal is the last signal in the column amplifier 110 to be processed. If so, the process proceeds to step 422. If the selected analog image signal is not the last signal, the process proceeds back to step 408, at which the next analog image signal is selected to be processed. At step 422, a determination is made whether the selected row of photosensitive pixels is the last row of photosensitive pixels in the sensor array 108 to be readout. If so, the process comes to an end. If the selected row is not the last row, the process proceeds back to step 404, at which the next row of photosensitive pixels is selected for readout.

Figure 5:
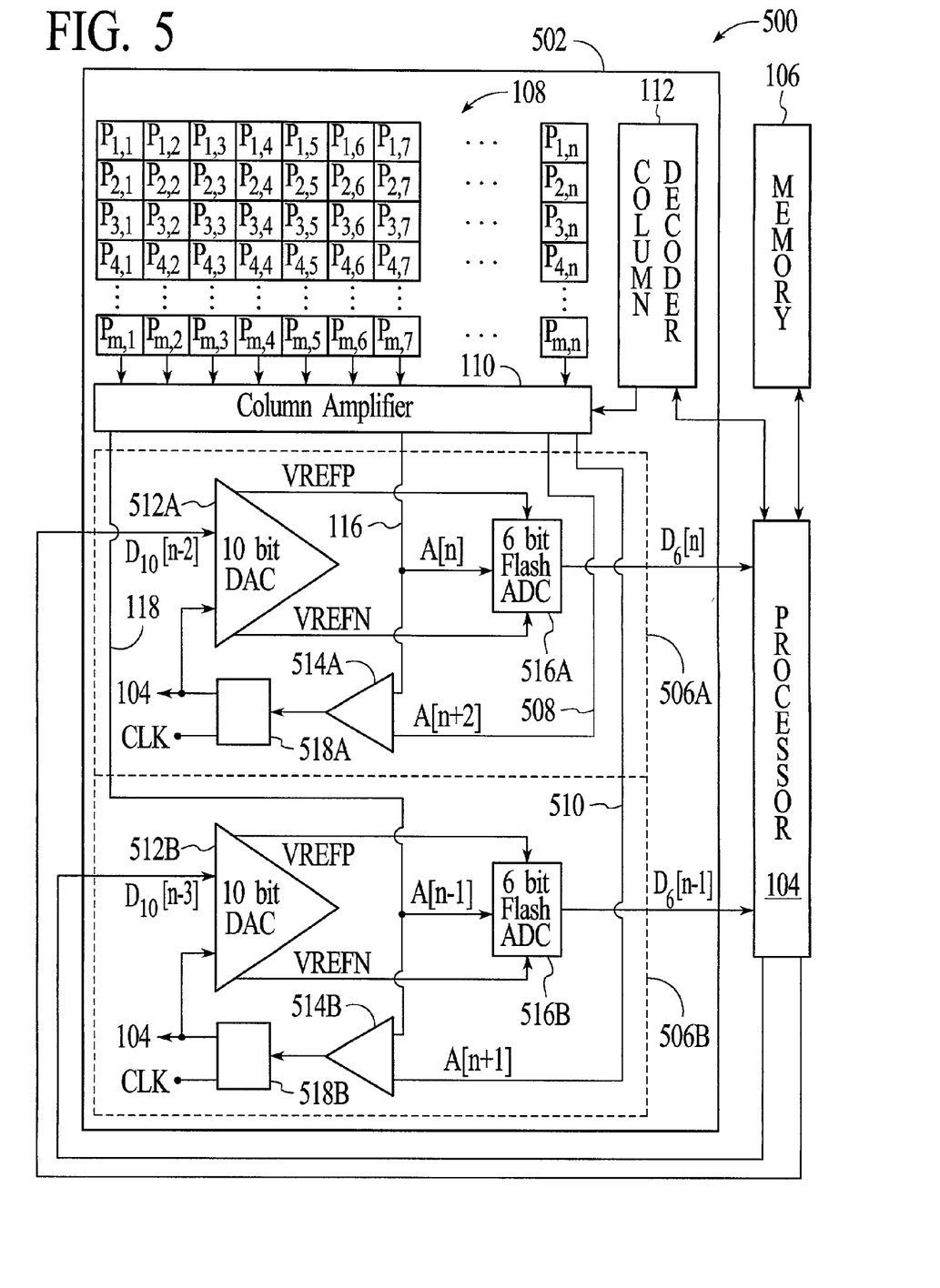
FIG. 5 is a block diagram of a digital imaging system in accordance with a second embodiment of the present invention.

In FIG. 5, a digital imaging system 500 in accordance with a second embodiment of the present invention is shown. The digital imaging system includes an image sensor module 502, the processor 104 and the memory 106. The image sensor module includes the sensor array 108, the column amplifier 110, the column decoder 112, and analog-to-digital converter (ADC) units 506A and 506B. In this second embodiment, the column amplifier includes two additional output lines 508 and 510. As described below, these additional output lines allow a second analog image signal from the column amplifier to be sampled during analog-to-digital conversion of a selected analog image signal.

The ADC units 506A and 506B are similar to the ADC units 114A and 114B of the digital imaging system 100 of FIG. 1 in that the ADC units 506A and 506B converts analog image signal from the sensor array 108 to digital signals and also correct erroneous signals from defective photosensitive pixels. Similar to the ADC units 114A and 114B, the ADC unit 506A operates on analog image signals from even numbered photosensitive pixels and the ADC unit 506A operates on analog signals from odd numbered photosensitive pixels. The ADC units 506A and 506B are essentially identical to each other. Therefore, only the ADC unit 506A is described in detail.

As shown in FIG. 5, the ADC unit 506A of the image sensor module 502 includes a 10 bit DAC 512A, a comparator 514A, a 6 bit flash ADC 516A, a register 518A. These components of the ADC unit are described with reference to FIG. 3, which illustrates the current row of photosensitive pixels being readout through the column amplifier 110. The [n] pixel represents the current pixel that is being readout for analog-to-digital conversion. The 10 bit DAC 512A is configured to receive the 10 bit digital signal $D_{10}[n-2]$ for the [n−2] pixel. The $D_{10}[n-2]$ signal is the last converted image signal for an even numbered pixel. Using the $D_{10}[n-2]$ signal, the 10 bit DAC generates the VREFP and VREFN voltages, which are dependent on the $D_{10}[n-2]$ signal and a delayed output of the comparator 514A from the register 518A.

The comparator 514A of the ADC unit 506A is connected to the column amplifier 110 by the output lines 116 and 508 to receive a pair of analog image signals for a single analog-to-digital conversion. The comparator receives the current analog image signal being processed, i.e., the A[n] signal, through the output line 116. In addition, the comparator receives the next analog image signal from an even numbered pixel to be processed, i.e., the analog signal A[n+2] from the [n+2] pixel. The comparator operates to compare the A[n] and A[n+2] signals. If the A[n] signal is greater than the A[n+2] signal, the comparator output a "1" signal. However, if the A[n] signal not greater than the A[n+2], the comparator outputs a "0" signal. The output signal of the comparator is transmitted to the register 518A, where the output signal is temporarily stored until the next conversion cycle. The register 518A may utilize flip-flops to temporarily store the output signal of the comparator until a clock signal is received. When the clock signal is received the delayed output signal of the comparator is transmitted to the 10 bit DAC 512A and the processor 104. Thus, for the current A[n] signal, the output signal of the comparator from the previous conversion cycle is used, which resulted from a comparison of A[n−2] signal and the A[n] signal. If the 10 bit DAC receives a "1" signal from the register 518A, the VREFP and VREFN voltages generated by the 10 bit DAC are set such that:

$VREFP=D_{10}[n-2]+64$, and $VREFN=D_{10}[n-2]$.

If the 10 bit DAC receives a "0" signal from the register, the VREFP and VREFN voltages generated by the 10 bit DAC are set such that:

$VREFP=D_{10}[n-2]$, and $VREFN=D_{10}[n-2]-64$.

The 6 bit flash ADC 516A of the ADC unit 506A is configured to convert the A[n] signal from the [n] pixel to a 6 bit digital signal $D_6[n]$ using the VREFP and VREFN voltages as references, which are provided by the 10 bit DAC 512A. The VREFP and VREFN voltages define the range for analog-to-digital conversion by the 6 bit flash ADC. However, since the VREFP and VREFN voltages are dependent on the comparison between the A[n−2] signal and the A[n] signal, the full range for analog-to-digital conversion is from $D_{10}[n-2]-64$ to $D_{10}[n-2]+64$, which is identical to the analog-to-digital conversion range of the ADC unit 506A of the digital imaging system 100 in accordance with the first embodiment. Thus, the comparator 514A, the 6 bit flash ADC 516A and the register 518A perform an equivalent function as the 7 bit flash ADC 122A of the ADC unit 114A, shown in FIG. 1, with the assumption that the A[n] signal is relatively comparable to the A[n−2] signal. However, the configuration of the ADC unit 506A allows the use of the 6 bit flash ADC 516A instead of the 7 bit flash ADC 122A. This translates into a reduction of 63 comparators for the ADC unit 506A.

The output $D_6[n]$ signal of the 6 bit flash ADC 516A is transmitted to the processor 104, where the $D_6[n]$ signal is converted to a 10 bit digital signal $D_{10}[n]$. The processor converts the $D_6[n]$ signal to the $D_{10}[n]$ signal by either adding the $D_6[n]$ signal to the $D_{10}[n-2]$ signal, or subtracting the $D_6[n]$ signal from the $D_{10}[n-2]$ signal, depending on the delayed output of the comparator 514A from the register 518A. If the delayed output signal of the comparator is a "1" signal, i.e., the A[n+2] signal is greater than the A[n] signal, then the $D_6[n]$ signal is added to the $D_{10}[n-2]$ signal to derive the $D_{10}[n]$ signal. However, if the delayed output of the comparator is a "0" signal, i.e., the A[n+2] signal is not greater than the A[n] signal, then the $D_6[n]$ signal is subtracted from the $D_{10}[n-2]$ signal to derive the $D_{10}[n]$ signal. The $D_{10}[n]$ signal is then temporarily stored in the memory 106 to be used for the next analog image signal from an even numbered pixel, i.e., the A[n+2] signal.

The other ADC unit 506B of the image sensor module 502 also includes a 10 bit DAC 512B, a comparator 514B, a 6 bit flash ADC 516B and a register 518B. However, the ADC unit 506B operates on the analog signals from odd numbered photosensitive pixels of the current row of pixels being readout of the sensor array 108. Thus, the input to the 6 bit flash ADC 516B is an analog image signal A[n−1] from the [n−1] pixel, which represents the current analog signal from an odd numbered photosensitive pixel being extracted from the column amplifier 110 to the ADC unit 506B. In addition, the inputs to the comparator 514B are the A[n−1] signal and the analog image signal A[n+1] from the [n+1] pixel, which are transmitted from the column amplifier through the output lines 118 and 510. Furthermore, the input to the 10 bit DAC 512B is the last converted digital image signal $D_{10}[n-3]$ for the [n−3] pixel, which is the last converted signal for an odd numbered pixel. The output of the ADC unit 506B is a 6 bit digital signal $D_6[n-1]$ for the [n−1] pixel, which is converted to a 10 bit digital image signal $D_{10}[n-1]$ by the processor 104.

Although the ADC units 506A and 506B are described herein as being configured to convert analog image signals to 10 bit digital image signals, the ADC units may be configured to convert analog image signals to higher or lower bit digital image signals. In alternative embodiments, the ADC units may utilize higher or lower bit DACs to generate the VREFP and VREFN voltages. In addition, higher or lower bit flash ADCs may be utilized instead of the 6 bit flash ADCs 516A and 516B to adjust the sensitivity of the ADC units for correction of erroneous signals from defective photosensitive pixels.

Figure 6:
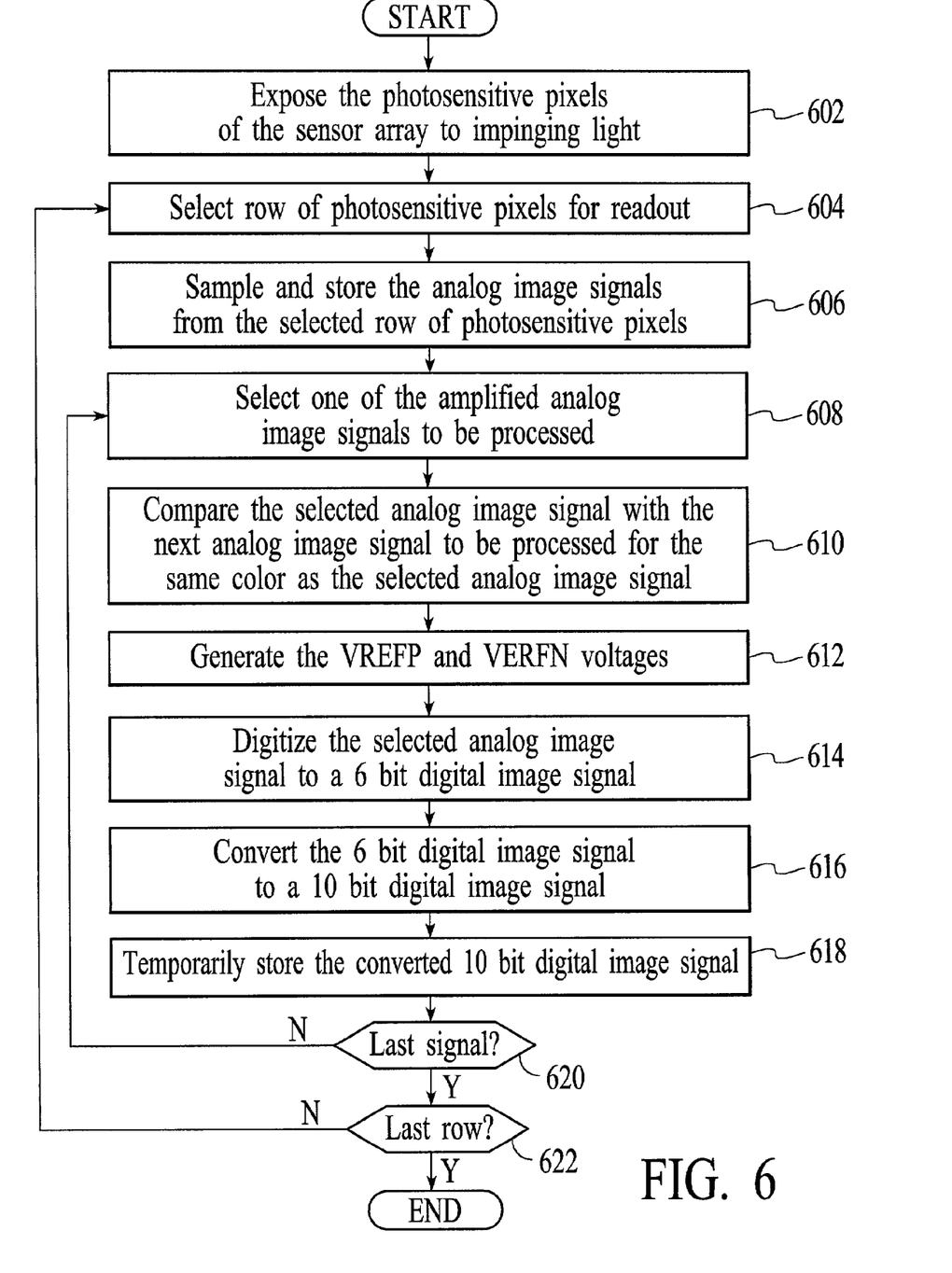
FIG. 6 is a process flow diagram illustrating the operation of the digital imaging system of FIG. 5.

The operation of the digital imaging system 500 is described with reference to the process flow diagram of FIG. 6 and the illustrated row of photosensitive pixels of FIG. 3. At step 602, the photosensitive pixels of the sensor array 108 are exposed to impinging light to capture a scene of interest in the form of analog electrical image signals. After a predefined exposure period, a row of photosensitive pixels is selected for readout, at step 604. The analog image signals from the selected row of photosensitive pixels are then sampled and stored by the column amplifier 110, at step 606. The stored analog image signals are then serially extracted for analog-to-digital conversion.

Next, at step 608, one of the stored analog image signals is selected to be processed by the column decoder 112. If the selected analog image signal is from an even numbered photosensitive pixel, the selected analog image signal is processed by the ADC unit 506A. Otherwise, the selected analog image signal is processed by the ADC unit 506B. At step 610, the selected analog image signal is compared with the next analog image signal to be processed for the same color as the selected analog image signal by the comparator 514. If the selected analog image signal is greater than the next analog image signal to be processed, the comparator outputs a "1" signal. If the selected analog image signal is not greater than the next analog image signal, the comparator outputs a "0" signal.

Next, at step 612, the VREFP and VREFN voltages are generated by the 10 bit DAC 512 using a delayed output signal of the comparator 514 from the register 518 and the last converted 10 bit digital image signal for the same color as the selected analog image signal, e.g., the last converted digital image signal for an even numbered pixel if the selected analog image signal is from an even numbered pixel. The delayed output signal of the comparator is the result of a comparison during the last conversion cycle for the same color as the selected analog image signal. The 10 bit digital image signal may be from the previously selected row of the photosensitive pixels. If the selected analog image signal is the very first signal to be processed for a captured image, then the 10 bit digital image signal may be a default signal generated by the processor 104. At step 614, the selected analog image signal is digitized to a 6 bit digital image signal by the 6 bit flash ADC 516 using the VREFP and VREFN voltages as references. The 6 bit digital image signal is then converted to a 10 bit digital signal by the processor, at step 616. If the delayed output of the comparator is a "1" signal, the 6 bit digital image signal is added to the last converted 10 bit digital signal to derive the current 10 bit digital signal. If the delayed output of the comparator is a "0" signal, the 6 bit digital image signal is subtracted from the last converted 10 bit digital signal to derive the current 10 bit digital signal. Next, at step 618, the converted 10 bit digital signal is temporarily stored in the memory 106 to be used for the next analog signal from an even or odd numbered photosensitive pixel, depending on the current selected signal.

At step 620, a determination is made whether the selected analog image signal is the last signal in the column amplifier 110. If so, the process proceeds to step 622. If the selected analog image signal is not the last signal, the process proceeds back to step 608, at which the next analog image signal is selected to be processed. At step 622, a determination is made whether the selected row of photosensitive pixels is the last row of photosensitive pixels in the sensor array to be readout. If so, the process comes to an end. If the selected row is not the last row, the process proceeds back to step 604, at which the next row of photosensitive pixels is selected for readout.

What is claimed is:

1. A method of correcting erroneous image signals from a multicolor pixel array, the method comprising the steps of:

providing a high signal and a low signal based on an image signal of a previously processed pixel of the multicolor pixel array, the previously processed pixel having a single color designation, said image signal of said previously processed pixel being an image signal from a set of image signals that represents a single captured image of a scene of interest, said high signal and said low signal defining a signal range about said image signal of said previously processed pixel; and digitizing an analog signal of a current pixel of the multicolor pixel array, which is separated from the previously processed pixel by a same predetermined of pixels as other processed pixels in the multicolor pixel array, using said high and low signals as references to derive a digitized signal of said current pixel within said signal range, including limiting said analog signal of said current pixel by said high and low signals, said analog signal of said current pixel being another image signal from said set of image signals.

2. The method of claim 1 further comprising a step of converting said image signal of said previously processed pixel to said high signal and said low signal.

3. The method of claim 2 wherein said step of converting said image signal of said previously processed pixel includes digital-to-analog converting said image signal of said previously processed pixel to said high signal and said low signal, wherein said high and low signals are voltages.

4. The method of claim 1 further comprising a step of comparing said analog signal of said current pixel with an analog signal of an other previously processed pixel, said analog signal of said other previously processed pixel being an other image signal from said set of image signals.

5. The method of claim 4 further comprising a step of converting said image signal of said previously processed pixel to said high signal and said low signal, wherein said high and low signals are dependent on said comparing of said analog signal of said current pixel with said analog signal of said other previously processed pixel.

6. The method of claim 1 wherein said step of digitizing said analog signal of said current pixel includes utilizing a flash analog-to-digital converter for said digitizing.

7. The method of claim 1 further comprising a step of adding a conversion signal to said digitized signal of said current pixel, said conversion signal being a digitized image signal of said previously processed pixel.

8. The method of claim 1 wherein said image signal of said previously processed pixel is a digital signal, and wherein said image signal has more bits than said digitized signal of said current pixel.

9. A system for correcting erroneous image signals from a multicolor pixel array, the system comprising:
   means for outputting a high signal and a low signal based on an image signal of a previously processed pixel of the multicolor pixel array, the previously processed pixel having a single color designation, said image signal of said previously processed pixel being an image signal from a set of image signals that represents a single captured image of a scene of interest, said high signal and said low signal defining a signal range about said image signal of said previously processed pixel; and
   an analog-to-digital converter having a high reference input and a low reference input to receive said high signal and said low signal, said analog-to-digital converter being configured to digitize an analog signal of a current pixel of the multicolor pixel array, which is separated from the previously processed pixel by a same predetermined of pixels as other processed pixels in the multicolor pixel array, using said high and low signals as references to derive a digitized signal of said current pixel within said signal range such that said analog signal of said current pixel is limited, said analog signal of said current pixel being an other image signal from said set of image signals.

10. The system of claim 9 wherein said outputting means includes a digital-to-analog converter to generate said high and low signals from said image signal of said previously processed pixel.

11. The system of claim 10 wherein said digital-to-analog converter is configured to convert an input digital signal having more bits than said digitized signal of said current pixel.

12. The system of claim 11 wherein said digital-to-analog converter is a ten bit digital-to-analog converter, and wherein said analog-to-digital converter is a seven bit analog-to-digital converter.

13. The system of claim 10 wherein said outputting means includes a comparator that outputs a comparison signal to said digital-to-analog converter, said comparison signal being based on a comparison of said analog signal of said current pixel with an analog signal of an other previously processed pixel, said analog signal of said other previously processed pixel being an other image signal from said set of image signals, said high and low signals generated by said digital-to-analog converter being dependent on said comparison.

14. The system of claim 13 wherein said digital-to-analog converter is a ten bit digital-to-analog converter, and wherein said analog-to-digital converter is a six bit analog-to-digital converter.

15. The system of claim 9 further comprising a means for adding a conversion signal to said digitized signal, said conversion signal being a digitized image signal of said previously processed pixel.

16. The system of claim 9 wherein said analog-to-digital converter is a flash analog-to-digital converter.

17. A system for correcting erroneous image signals during analog-to digital conversion comprising:
   a multi-color sensor array of photosensitive pixels, each pixel in the multi-color sensor array, the previously processed pixel having a single color designation, each of said photosensitive pixels being configured to accumulate an analog image signal when exposed to light to produce a set of analog image signals that represents a single captured image of a scene of interest; and
   an analog-to-digital converter unit operatively coupled to said sensor array to receive said set of analog image signals from said photosensitive pixels, said analog-to-digital converter unit comprising:
   a digital-to-analog converter that outputs a high signal and a low signal based on a digital image signal of a previously processed photosensitive pixel of the sensor array, said digital image signal of said previously processed pixel being an image signal derived from said set of analog image signals, said high signal and said low signal defining a signal range about said digital image signal of said previously processed pixel; and
   an analog-to-digital converter having a high reference input and a low reference input to receive said high signal and said low signal, said analog-to-digital converter being configured to digitize an analog signal of a current photosensitive pixel of the sensor array, which is separated from the previously processed pixel by a same predetermined of pixels as other processed pixels in the multicolor pixel array, using said high and low signals as references to derive a digitized signal of said current pixel within said signal range such that said analog signal of said current pixel is limited, said analog signal of said current pixel being an other image signal from said set of analog image signals.

18. The system of claim 17 wherein said digital-to-analog converter is configured to convert an input digital signal having more bits than said digitized signal of said current pixel.

19. The system of claim 17 wherein an analog-to-digital converter unit includes a comparator that outputs a comparison signal to said digital-to-analog converter, said comparison signal being based on a comparison of said analog signal of said current pixel with an analog signal of an other previously processed pixel, said analog signal of said other previously processed pixel being an other image signal from said set of analog image signals, said high and low signals being dependent on said comparison.

20. The system of claim 17 further comprising a means for adding a conversion signal to said digitized signal, said conversion signal being based on said low signal.

21. The system of claim 17 wherein said analog-to-digital converter is a flash analog-to-digital converter.

* * * * *